(12) United States Patent
Haritou et al.

(10) Patent No.: US 10,675,837 B2
(45) Date of Patent: Jun. 9, 2020

(54) APPARATUS AND METHOD FOR PROVIDING AN INTERSTITIAL SPACE

(71) Applicants: Christos Sotitious Haritou, New Marske (GB); Alan Fada, Washington (GB)

(72) Inventors: Christos Sotitious Haritou, New Marske (GB); Alan Fada, Washington (GB)

( * ) Notice: Subject to any disclaimer, the term of this patent is extended or adjusted under 35 U.S.C. 154(b) by 820 days.

(21) Appl. No.: 15/062,058

(22) Filed: Mar. 5, 2016

(65) Prior Publication Data

US 2017/0021587 A1 Jan. 26, 2017

(30) Foreign Application Priority Data

Mar. 5, 2015 (GB) .................................. 1503757.5
Mar. 31, 2015 (GB) .................................. 1505498.4

(51) Int. Cl.
| | |
|---|---|
| *B32B 5/02* | (2006.01) |
| *B65D 90/503* | (2019.01) |
| *F16L 58/16* | (2006.01) |
| *B32B 27/12* | (2006.01) |
| *F16L 58/10* | (2006.01) |
| *B32B 3/26* | (2006.01) |
| *F16L 59/12* | (2006.01) |
| *B32B 15/14* | (2006.01) |
| *B29C 53/60* | (2006.01) |
| *B32B 15/20* | (2006.01) |
| *B32B 29/00* | (2006.01) |
| *B32B 7/12* | (2006.01) |
| *B32B 27/06* | (2006.01) |
| *F16L 58/04* | (2006.01) |

(52) U.S. Cl.
CPC .............. *B32B 5/028* (2013.01); *B29C 53/60* (2013.01); *B32B 3/266* (2013.01); *B32B 5/024* (2013.01); *B32B 7/12* (2013.01); *B32B 15/14* (2013.01); *B32B 15/20* (2013.01); *B32B 27/06* (2013.01); *B32B 27/12* (2013.01); *B32B 29/002* (2013.01); *B65D 90/503* (2013.01); *F16L 58/04* (2013.01); *F16L 58/1063* (2013.01); *F16L 58/16* (2013.01); *F16L 59/12* (2013.01); *B32B 2260/028* (2013.01); *B32B 2260/046* (2013.01); *B32B 2262/0276* (2013.01); *B32B 2262/101* (2013.01); *B32B 2307/546* (2013.01); *B32B 2307/712* (2013.01); *B32B 2307/7265* (2013.01); *B32B 2405/00* (2013.01); *B32B 2607/00* (2013.01)

(58) Field of Classification Search
USPC ............................................................ 73/40
See application file for complete search history.

(56) References Cited

U.S. PATENT DOCUMENTS

2010/0075086 A1* 3/2010 Haritou .................. B32B 3/266
428/36.7

\* cited by examiner

Primary Examiner — Nathaniel T Woodward

(57) ABSTRACT

An apparatus for providing an interstitial space to the surface of wall, the apparatus comprises: an adhesive layer; a layer of fluid impervious and weather proof material in form of a tape, the tape partially overlapping itself; a layer of spacer material situated between the surface of the tape facing the wall and the surface of the adhesive layer distal from the wall. The spacer material has ends which are encapsulated, the apparatus providing a sealed interstitial space.

11 Claims, 6 Drawing Sheets

APPARATUS AND METHOD FOR PROVIDING AN INTERSTITIAL SPACE

FIELD OF THE INVENTION

The present invention relates to the provision of a monitorable interstitial space between a surface of a wall and skin attached to the wall, and in particular to the provision of monitorable interstitial spaces around pipes.

BACKGROUND OF THE INVENTION

The advantage of providing twin walls for tanks, such as fuel storage tanks, by constructing a monitorable interstitial space between the twin walls is understood and a number of systems are available for providing twin walls. Typically, the integrity of the tank is monitored by subjecting the space between the twin walls to a vacuum. If the vacuum fails this indicates that one of the twin walls has become porous, for example through mechanical piercing of one of the walls or through corrosion.

Some examples of solutions to the above-described problem are described below.

The publication WO 00/32394 describes a method of lining a fuel storage tank in which a keying means is applied to the surface of a tank. A corrosion barrier is then applied to the keying means. An interstitial grid is then applied to the tank and pliable glass reinforced plastics materials laid onto the grid. The glass reinforced plastics material is then exposed to ultra violet rays to cure the material and form a hardened inner liner shell for the tank.

An apparatus and method for lining a tank so as provide a monitorable interstitial space is described in GB2444486. This apparatus uses sheet material having adhesive applied to both sides to attach itself and the other components of the lining to the wall of a tank. The apparatus and method described in this invention have been found to be particularly effective in the lining of underground and aboveground storage tanks used for storing fuel, acids and other fluids.

Pipelines are susceptible corrosion. If a pipeline were to become porous the environmental damage resulting could be much worse than that occurring in the case of a leaking in tank, since in the case of a pipeline the volume of fluid is not limited in the same way as it is with a tank.

In some environments it is necessary to insulate pipelines. Corrosion of the outer surface of the pipeline can be a particular problem where pipelines are insulated. This is because condensation occurs on the surface of the pipeline and builds up between the surface thereof and the insulation.

Whilst the apparatus and methods described above in connection with providing monitor able interstitial space for tanks are not limited to tanks, and could theoretically be applied to pipelines, to do so is not straightforward.

In the case of a tank the environment where the work is carried out is self-contained, substantially stable, and controllable. For outdoor pipelines this is not the case and prevailing environmental conditions may either severely limit, or prevent the use of the components of the above-described apparatus and the equipment required for their installation.

It would therefore be desirable to provide an apparatus and method for providing an interstitial space between two walls, one of which may be the wall of a pipe or pipeline.

SUMMARY OF THE INVENTION

According to an aspect of the present invention there is provided an apparatus for providing an interstitial space to the surface of a wall, the apparatus comprising:

i. an adhesive layer;
ii. a layer of fluid impervious and weather proof material in the form of a tape, the tape partially overlapping itself;
iii. a layer of spacer material situated between the surface of the tape facing the wall and the surface of the adhesive layer distal from the wall;

and wherein the spacer material has ends which are encapsulated, the apparatus providing a sealed interstitial space.

Preferably, the sealed interstitial space is monitorable and more preferably, a monitoring means is provided for monitoring the integrity of the sealed interstitial space.

It is preferred that the sealed interstitial space is subjected to a vacuum and more preferably, a vacuum monitoring means is connected to the sealed interstitial space.

The wall may be part of pipeline. Preferably the surface of the wall is an outer surface.

The apparatus may comprise a layer of fluid impervious material between the fluid impervious and weather proof tape and the spacer layer. The fluid impervious material may be a foil such as metallic (far example aluminium) or plastic foil. The fluid impervious material may be in sheet or tape form.

The adhesive layer may be provided by a material that is impregnated with adhesive, such as a paper based material impregnated with adhesive. Alternatively, an adhesive may be sprayed or otherwise applied to the surface of the wall, or the adhesive may be applied to the side of the spacer layer that is to face the outside of the wall, either as a pre-applied adhesive or during construction of the apparatus.

A farther layer may be provided, in particular where a fluid impervious foil is used. The layer is a reinforcement layer situated between the fluid impervious foil and the fluid impervious and weather proof tape. The reinforcement layer is preferably a scrim layer and more preferably the scrim layer fibre glass or polymer such as polyester and is preferably woven. The scrim layer may be in the form of a tape. Alternatively, the reinforcement layer may be a tape such as a non-permeating tape, typically with adhesive on one side thereof.

The fluid impervious and weather proof material tape may be a self-amalgamating tape.

The apparatus may be applied to only a part of a wall. In the case of a pipeline, the apparatus may only be applied where there is a need to be able to monitor the integrity of the pipe, for example over weld seams.

A layer of insulation may be provided to the side of the apparatus distal from the wall to which the apparatus is applied.

According to another aspect of the invention there is provided a method of providing an interstitial space to the surface of a wall comprising the steps of building up the elements of the apparatus of the first aspect of the invention on the surface of a wall.

Preferably, the method comprises applying a vacuum to the interstitial space, and more preferably the step of monitoring the vacuum.

According to another aspect of the invention there is provided a wall having an apparatus according to the first aspect of the invention applied thereto.

BRIEF DESCRIPTION OF THE DRAWINGS

In the drawing, which illustrate preferred embodiments of the invention, and are by way of example.

DETAILED DESCRIPTION OF THE PREFERRED EMBODIMENTS

Figure 1:
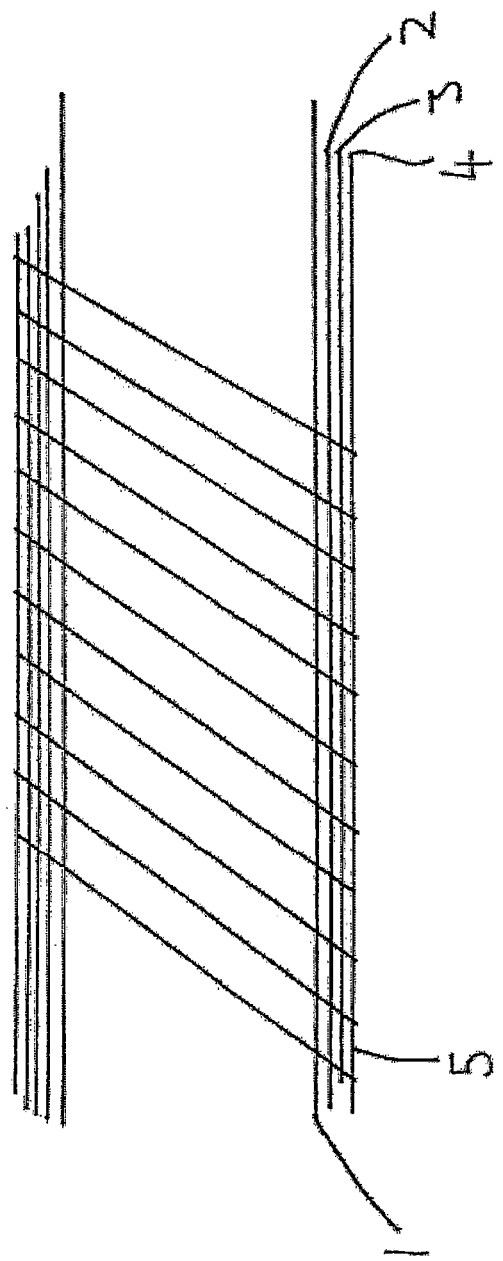
FIG. 1 is a schematic representation of a pipeline having an apparatus according to the invention applied to the outer surface thereof.

Referring now to FIG. 1, there is shown a pipeline 1 to which the apparatus of the invention is attached. The apparatus comprises a plurality of layers. The first layer 2 provides an adhesive to which the second layer 3 is attached.

In the illustrated example, the first layer 2 is formed by a layer of flexible material 2 coated with adhesive on both sides thereof. In the present example the flexible material is a paper impregnated with adhesive. Each side of the flexible material 2 is typically covered with a layer of peel-off material which when peeled off reveals the sticky surface. The peel off layer is removed from one surface of the flexible material 2 and that surface is presented up to and press on to the outer surface of the wall 1. With the peel-off material removed from the other surface of the flexible material 2 of the first the second layer 2, which is a layer of non-woven grid material 3 is attached to the surface of the flexible material 2 of the first layer that is distal from the outer surface of the pipeline 1. The non-woven grid is open and highly permeable, and in the present example a thermoplastic. The adhesive applied to the surface of the flexible material 2 is sufficient to hold the layer of non-woven grid material 3 onto the flexible material 2. However, additional adhesive, either a layer or in spots may be provided between the flexible material 2 and the non-woven grid material 3.

A third layer 4 is formed by a fluid pervious layer comprising a foil sheet having adhesive applied to at least one side thereof. Prior to attachment of the foil sheet to the non-woven grid 3 a peel of layer is removed from the adhesive covering one side of the foil sheet. This adhesive attaches the foil sheet to the non-woven grid 3.

A fourth sealing layer 5 is formed by wrapping a fluid impervious and weather proof tape around the pipeline, over the top of the previously applied payers. The fluid impervious tape utilised in the illustrated example is a self-amalgamating tape, that is when the tape is stretched or tensioned over itself as it is wrapped around the pipeline, the overlapping regions of the tap unite or amalgamate to form a continuous weather-proof layer. In an alternative, the tape may be provided with has adhesive to one side thereof, this adhesive providing for the tape to attach to the foil 4 and where the tape overlaps, to itself.

Figure 2:
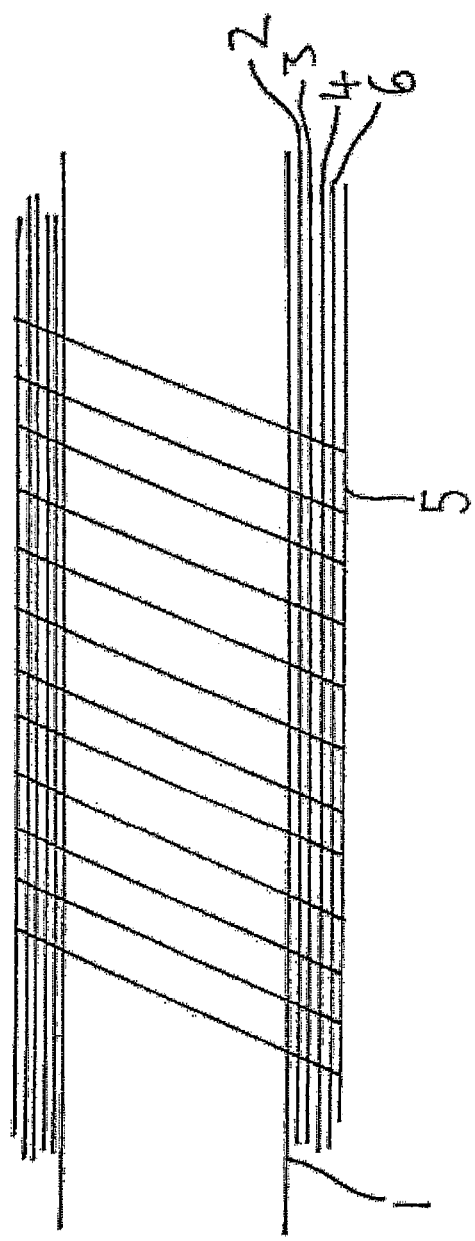
FIG. 2 is a schematic representation of pipeline having an apparatus according to another embodiment of the invention applied to the outer surface thereof.

FIG. 2 illustrates another embodiment of the invention in which an additional layer 6 is provided between the fluid impervious foil sheet 4 and the fluid impervious tape 5. The layer 6 comprises a scrim layer, which in the present example is formed of woven fibre glass or polymer such as polyester. In the embodiment illustrated in FIG. 2, the scrim layer is a separate layer that is attached to the foil sheet 4 by a suitable adhesive. The adhesive may be provided on the underside of the scrim layer or on the outer side of the foil sheet. In either case, the adhesive would be covered with a peel off layer covering the adhesive until it is required. As an alternative to a scrim layer, the layer 6 may be a tape, such as non-permeating tape. Typically, such a non-permeating tape would have adhesive to one side thereof.

The function of the layer 6 is to protect the foil 4 from forces exerted thereon by the tape 5 during its application, which forces might tear the foil 4.

The function of the non-woven grid material 3 together with the layers of material between which it is sandwiched is to provide a monitorable interstitial space. Monitoring is typically achieved by applying a vacuum to the interstitial space and monitoring the vacuum. If the wall 1 of the tank or the outer layer of the composite material is compromised the vacuum will fail.

Figure 3:
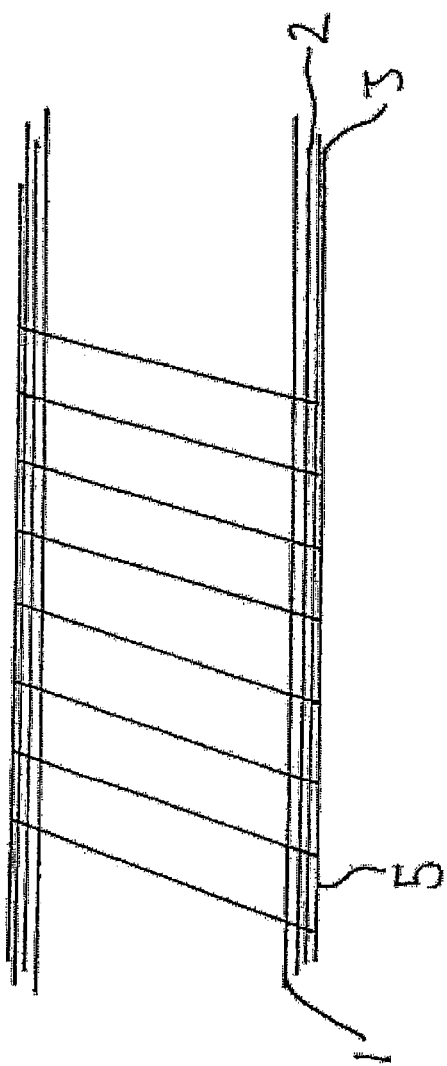
FIG. 3 is a schematic representation of a pipeline having an apparatus according to another embodiment of the invention applied to the outer surface thereof.
Figure 4:
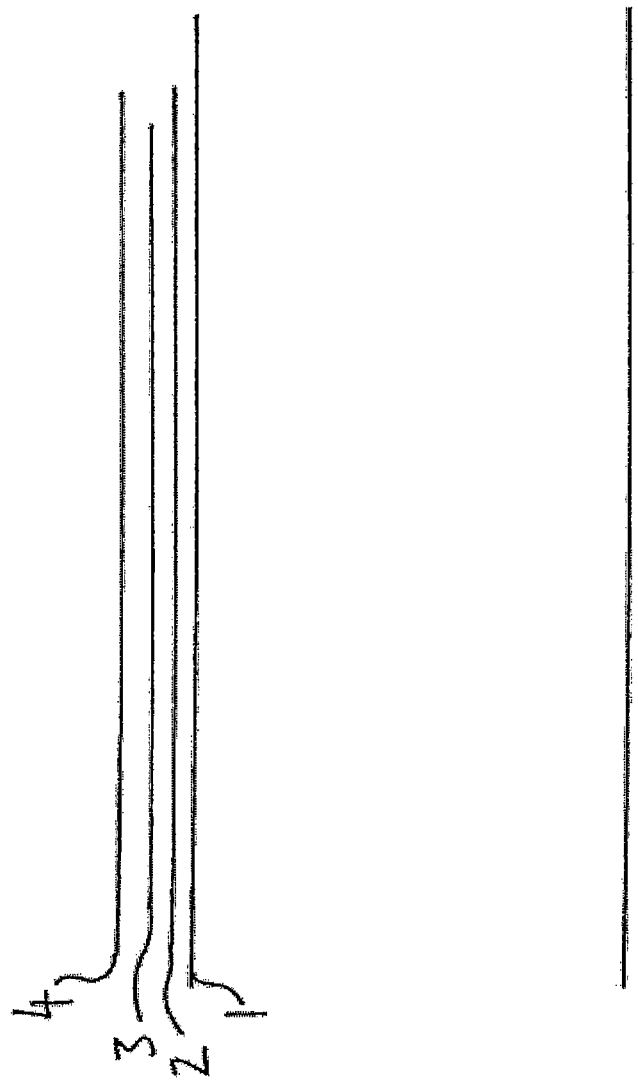
FIG. 4 is an exploded view of the apparatus illustrated in FIG. 1 in a partial state of assembly.

FIG. 3 illustrates another alternative embodiment of the invention. In this embodiment the foil sheet 4 is omitted. The tape 5 is therefore applied directly over the non-woven grid material 3.

In 4 it can be seen that the layer 4 extends beyond the layer of non-woven grid material 3. The foil sheet is pressed on to the adhesive provided by the layer 2, thereby encapsulating the layer 3. In the embodiment illustrated in FIG. 3, where the foil sheet 4 is omitted, the tape 5 would extend beyond the end of the layer 3, encapsulating this layer.

By encapsulating the layer 3, a sealed interstitial space is formed to which a vacuum may be applied.

The layers 2, 3, 4 and 6 may be applied either in the form of sheet material or each layer may be formed of tape. The advantage of providing each layer as a tape is that the application of each layer to the pipeline may be performed using tape applicators. This is also the case for the fluid impervious tape 5. The function of tape applicators, also known as tape wrappers is known in the art.

The advantage of using a fluid impervious tape is that application of the tape can be carried out in almost any weather conditions and either without specialist equipment or with specialist equipment that is simple to operate and can be used in most weather conditions.

Figure 5:
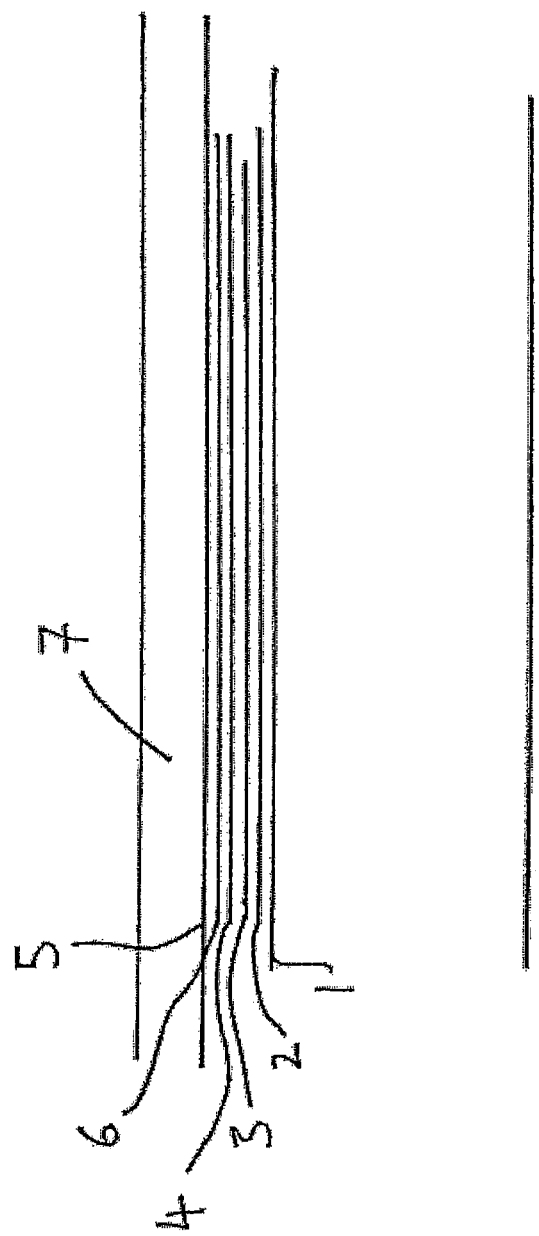
FIG. 5 is a cross-sectional elevation of an insulated pipeline according to another embodiment of the invention.

FIG. 5 illustrates an insulated pipeline where a layer of insulation 7 is situated to the outside of the fluid impervious tape 5.

By providing a vacuum between the insulation 7 and the outer surface the pipeline 1, condensation on the outer surface of the pipeline 1 is very much reduced because the moisture containing air is evacuated from the air space adjacent the outer surface of the pipeline 1.

Figure 6:
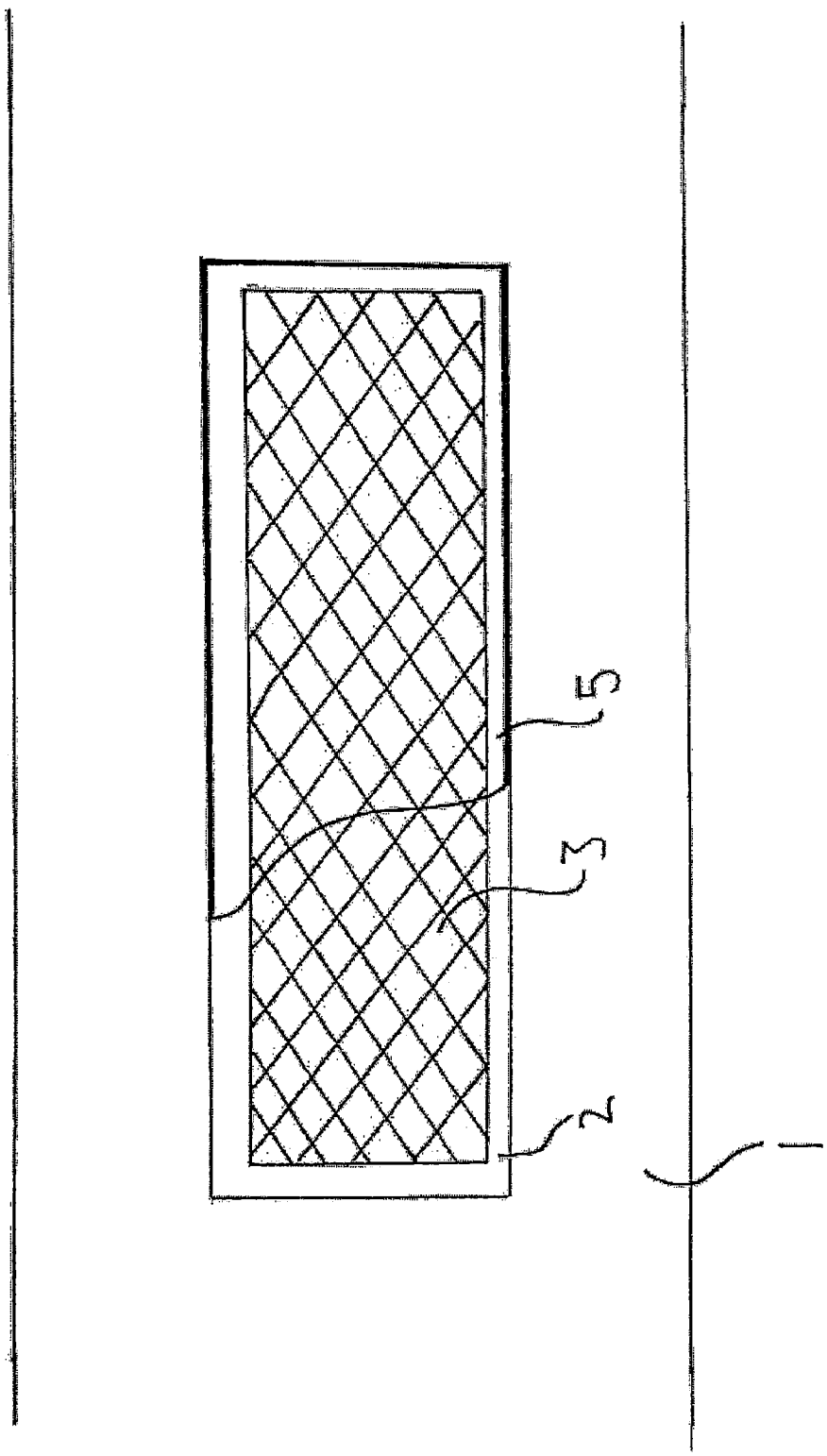
FIG. 6 illustrates a further embodiment of the apparatus of the invention.

FIG. 6 illustrates an embodiment of the invention where the apparatus is applied only to a small part of a pipeline 1. The apparatus comprises a layer of adhesive 2, a layer 3 of spacer material and fluid impervious and weather proof tape 5. The adhesive layer 2 extends beyond the peripheral edge of the layer 3 of spacer material. The tape 5 is held down by the adhesive 2. The adhesive layer 2 may extend beneath the layer 3 or may simply surround the layer 3. Where the latter is the case, the adhesive may be provided on the underside of the tape 5. The tape may be wrapped around the pipeline, but the monitorable interstitial space only may only be provided for a small part of the pipeline. In such an embodiment the adhesive layer 2 and the layer 3 of spacer material would be as shown in FIG. 6 but the tape 5 would be as shown in FIG. 1.

In all the above-described embodiments, where a surface is corroded, the corrosion would be repaired before applying the apparatus of the invention. This may involve blasting, grinding or sanding back to bare metal and may also involve a protective paint or resin.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise each feature disclosed is one example of a generic series of equivalent or similar features.

The invention claimed is:

1. An apparatus and a pipe, the apparatus providing an interstitial space to an outer surface of the pipe, the pipe having an axial direction and the apparatus comprising:
   i. an adhesive layer around the pipe and adhered to the outer surface of the pipe;
   ii. a layer of fluid impervious and weather proof material in the form of a tape, the tape wrapped around the pipe and the tape partially overlapping itself in the axial direction of the pipe;
   iii. a layer of fluid permeable spacer material situated between a surface of the tape facing the outer surface of the pipe and a surface of the adhesive layer distal from the outer surface of the pipe;
   and wherein the spacer material has ends which are encapsulated by the tape, the apparatus providing a sealed interstitial space between the outer surface of the pipe, the surface of the tape facing the outer surface of the pipe and the encapsulated ends, wherein the fluid permeable spacer material is in the form of a sheet or a tape and the apparatus further includes a vacuum source, the sealed interstitial space being subjected to a vacuum by the vacuum source during use of the pipe and wherein a vacuum monitoring means is connected to the sealed interstitial space and the vacuum to which the sealed interstitial space is subjected is monitored by the vacuum monitoring means, which vacuum monitoring means monitors the integrity of the sealed interstitial space.

2. An apparatus according to claim 1, wherein apparatus may comprise a layer of fluid impervious material between the fluid impervious and weather proof tape and the spacer layer.

3. An apparatus according to claim 2, wherein the fluid impervious material is a foil.

4. An apparatus according to claim 2, comprising a reinforcement layer situated between the fluid impervious foil and the fluid impervious and weather proof tape.

5. An apparatus according to claim 4, wherein the reinforcement layer is one of: a scrim layer and a non-permeating tape.

6. An apparatus according to claim 5, wherein the scrim layer is formed of one of: fibre glass and polymer.

7. An apparatus according to claim 1, wherein the layer of spacer material is in one of: sheet form and tape form.

8. An apparatus according to claim 1, wherein the adhesive layer is provided by a material that is impregnated with adhesive.

9. An apparatus according to claim 8, wherein the material that is impregnated with adhesive is in one of: sheet form and tape form.

10. An apparatus according to claim 1, wherein the fluid impervious and weather proof tape is a self-amalgamating tape.

11. An apparatus according to claim 1, further comprising a layer of insulation provided to the side of the apparatus distal from the wall to which the apparatus is applied.

* * * * *